July 22, 1924.
J. L. CREVELING
1,502,374
ELECTRIC REGULATION
Original Filed July 29, 1919
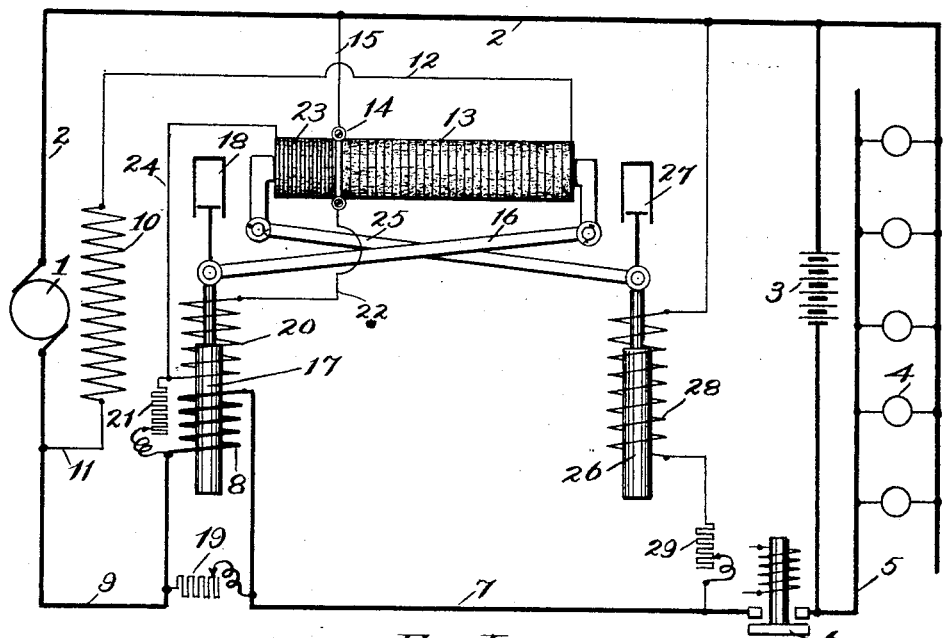
Fig. I.
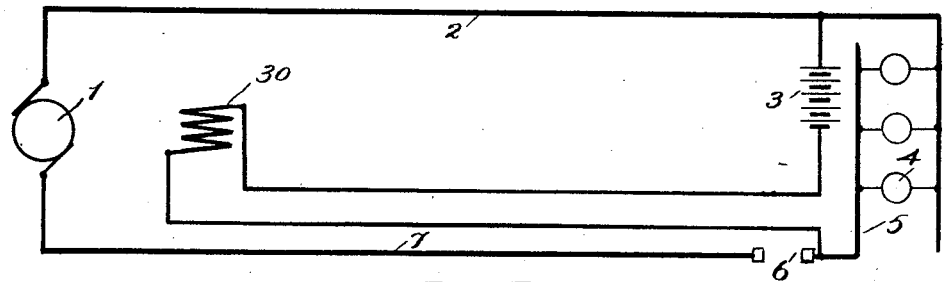
Fig. II.
INVENTOR.
John L. Creveling Patented July 22, 1924.

1,502,374

UNITED STATES PATENT OFFICE.

JOHN L. CREVELING, OF TUCSON, ARIZONA, ASSIGNOR TO GOULD COUPLER COMPANY, A CORPORATION OF NEW YORK.

ELECTRIC REGULATION.

Application filed July 29, 1919, Serial No. 313,991. Renewed May 12, 1924.

*To all whom it may concern:*

Be it known that I, JOHN L. CREVELING, a citizen of the United States, residing at Tucson, county of Pima, and State of Arizona, have invented certain new and useful Improvements in Electric Regulation, of which the following is a description.

My invention pertains to that class of electric regulation wherein a dynamo or generator is regulated in a predetermined manner, and has for a particular object to provide means whereby the same will be automatically regulated within narrow limits.

A more specific object of my invention is to produce means whereby a dynamo or generator driven at variable speeds and employed to charge a storage battery and operate lamps or other translating devices in conjunction therewith may be automatically regulated to compensate for speed changes and to charge the battery in a predetermined and desired manner.

My invention is particularly applicable to systems of this character such as are now commonly in use for lighting railway cars, and will therefore be described with respect to such a system.

Fig. I is a diagrammatic representation of one type of such system chosen to illustrate one embodiment of my invention.

Fig. II is a diagrammatic representation of a modification which may be made in the system of Fig. I.

In the drawing, 1 represents a dynamo or generator the positive terminal of which is connected as by lead 2 with the positive side of the storage battery 3 and lamps or other translating devices indicated at 4. The battery and translating devices have their negative terminals connected with the wire 5, carried to one terminal of the switch 6, the opposite terminal of which is connected with the wire 7 leading to one end of the solenoid or winding 8, the opposite end of which is connected as by wire 9 with the negative terminal of the generator. The generator is provided with a field exciting means, in this instance indicated as a shunt coil 10, one end of which is connected across the lead 9 as by wire 11, while the other end is connected as by wire 12 with one end of the carbon pile 13, the opposite end of which is in contact with a fixed disk or abutment 14 of conducting material, connected as by wire 15 with the lead 2. Therefore, it will be noted that the coil 10 is in shunt across the generator through the carbon pile 13, and the operation of the generator may be regulated by proper manipulation of the carbon pile 13, in a well known manner. The carbon pile 13 may have its pressure and, therefore, its resistance, varied by proper manipulation of the bellcrank lever 16, which is so arranged that it may be operated by movement of the core 17 against the retarding action of the dashpot 18. The solenoid 8 surrounds the core 17 and, when energized, tends to lift the core 17; while the energization of the coil may be adjusted as by the adjustable shunt 19. 20 is a fine winding having one terminal connected through the adjustable resistance 21 with the lead 9 of the generator. The other terminal of the said winding is connected as by wire 22 with the member 14. The carbon pile 23 has one of its ends in contact with the member 14, and the opposite end connected as by wire 24 with the resistance 21 and one end of the coil 20, as indicated, so that the carbon pile 23 and the coil 20 are in shunt to each other across the generator mains, through the resistance 21. Therefore, excitation of the coil 20 may be regulated by the regulating resistance 23 which may be varied by manipulating the lever 25 which may be operated by proper movement of the core 26 against the retarding action of dashpot 27. The core 26 is surrounded by the coil 28 in shunt across the generator, as indicated, and may have its operation regulated by the adjustment of the variable resistance 29.

In Fig. II like numerals are used to indicate like parts, and the only modification intended to be illustrated is that the coil 30 in series with the battery may be used in place of the coil 8 in series with the generator of Fig. I, if desired.

The switch 6 may be of any suitable type, and I prefer to use one of the usual automatic switches which will close its circuit when the voltage of the generator is substantially equal to that of the storage battery, and open the circuit when the generator voltage falls very slightly below that of the battery, in such manner as to prevent back discharge from the battery through the generator. As these switches are well known in the art, and the particular type used forms no part of my present invention, details are purposely omitted for the sake of brevity.

An operation of my invention is substantially as follows:

If the generator be at rest or operating at sufficiently low speed, switch 6 will be open and the translating devices may be supplied by the storage battery in a well known manner. If the generator have its voltage brought up to slightly in excess of that of the storage battery, switch 6 will close and the generator will then supply current to the battery and translating devices in multiple therewith.

The current returning to the generator through coil 8 will cause the same to tend to raise the core 17 and increase the resistance 13. And I so adjust the weight of the core 17 and other cooperating parts that, by proper adjustment of the resistance 19, a desired output of the generator may be maintained through the coil 8 without affecting the field excitation, through the instrumentality of the pile 13; and a very slight tendency of the current to rise above the predetermined and adjusted standard will cause the core 17 to be raised in such manner that the desired output of the generator will not be appreciably exceeded throughout wide speed changes of the generator.

With the generator in operation, some current will flow from the lead 2 through wire 15, member 14, wire 22, coil 20 and resistance 21 to the lead 9, and also around coil 20 through pile 23 and wire 24. And, if the resistance of the pile 23 be quite low, as it is when the disks are compressed, only a negligible current will pass through the coil 20, which is practically short-circuited or shunted out by the pile 23, notwithstanding the current through the pile 23 will be of very moderate or low value owing to the presence of the resistance 21. Current will also flow through the coil 28 and tend to raise the core 26 and increase the resistance of the pile 23. And I so choose the relationship between the core 26, coil 28 and adjustable resistance 29 that I can, by adjusting 29, cause the coil 28 to allow a predetermined voltage to be impressed upon the battery 3 without materially affecting the resistance 23. And even a slight tendency toward increase in voltage above this predetermined amount will raise the core 26 and increase the resistance of the pile 23 in such manner as to strengthen the coil 20 and cause it to affect the core 17 in such manner as to so manipulate the resistance 13 that this predetermined voltage across the coil 28 can not be exceeded within very narrow limits, even though the current in the coil 8 may fall to a very low or negligible or zero value.

The operation of that modification shown in Fig. II is substantially the same as that outlined above with respect to Fig. I, except that the coil 30 may operate the core 17 in response to current fluctuations in the battery circuit instead of fluctuations in the main circuit as in Fig. I.

It will therefore be obvious that I have produced a system wherein the current in a circuit supplied by the generator may be held within very narrow limits, and the generator regulated in response to current fluctuations throughout wide speed changes; and wherein when the voltage across a circuit supplied by the generator, as for example the battery circuit, reaches a predetermined limit the generator is regulated in response to voltage fluctuations within very narrow limits throughout changes in speed.

It will also be noted that I have produced a system operating as above, and wherein a great many of the structural advantages of systems now in common use are retained; and, furthermore, some systems now in use and illustrated in numerous patents can be altered with very little difficulty and small change of structure to operate in accordance with my present invention.

I do not wish in any way to limit myself to any of the exact constructions or details of operation given above to illustrate one embodiment of my invention, for it will be obvious that wide departure may be made without departing from the spirit and scope thereof, which is set forth in the following claims:

1. Means for regulating a generator comprehending a regulating element, means for affecting said element in response to current fluctuations, means for usurping the function of the current responsive means, and voltage responsive means for controlling said usurping means and regulating the generator.

2. The combination with a generator and a regulating means controlling the operation thereof, of current responsive means for operating said regulating means, electromagnetic means for dominating said current responsive means to substantially perform the regulation of the generator in place thereof, and voltage responsive means for controlling the operation of said electromagnetic means and regulating the generator.

3. The combination with a generator and regulating means the operation of which controls the generator, current responsive means capable of operating the regulating means, electromagnetic means adapted to assist the current responsive means and substantially dominate the same, and voltage responsive means for controlling the operation of said electromagnetic means and thereby regulating the generator for constant voltage.

4. The combination with a generator, of regulating means controlling the same, current responsive means for automatically operating the regulating means, electromagnetic means for assisting and ultimately substantially dominating the current responsive means, a variable resistance element controlling said electromagnetic means, and voltage responsive means controlling the operation of said resistance element and thereby regulating the generator to hold its voltage constant when a predetermined value is reached.

5. The combination with a generator, of regulating means controlling the same, current responsive means for automatically operating the regulating means, electromagnetic means for assisting and ultimately substantially dominating the current responsive means a variable resistance element controlling said electromagnetic means, and voltage responsive means controlling the operation of said resistance element and thereby producing voltage regulation which supersedes current regulation when the voltage across the generator reaches a predetermined limit.

6. The combination with a generator, storage battery and translating devices supplied thereby, of means for regulating the generator comprehending a regulating device, current responsive means for controlling said regulating device whereby the current generated may be held from exceeding a predetermined limit regardless of the condition of the storage battery, electromagnetic means for assisting the current responsive means, voltage responsive means controlling said elctromagnetic means, the arrangement of the electromagnetic means and voltage responsive means being such that when the generator and battery voltage reach a predetermined limit the voltage responsive means usurps the regulation of the generator by controlling the electromagnetic means and so dominates the current responsive means in the regulation of the generator that voltage regulation supersedes current regulation, and the current in the current responsive means may fall off without appreciably disturbing the regulation caused by the voltage responsive means.

7. The combination with a variable speed generator and its field circuit, of a regulator comprehending a carbon pile affecting the field circuit, current responsive means affecting said carbon pile, a second carbon pile in juxtaposition to and mechanically separated from the first carbon pile and in electrical communication therewith, means whereby manipulation of the second named carbon pile may operate the first named carbon pile, and voltage responsive means for controlling the operation of the generator to compensate for speed changes by operating the second named carbon pile.

8. The combination with a generator and a regulator therefor comprehending a compressible pile, of independently movable members operating upon each end of said pile, means for dividing said pile, in effect, into independent portions, current responsive means for affecting one of the above-mentioned members to affect one portion of said pile, and means cooperating with the current responsive means affected by manipulation of another portion of said pile.

9. The combination with a generator and a regulator therefor comprehending a compressible pile, of independently movable members operating upon each end of said pile, means for dividing said pile, in effect, into independent portions, current responsive means for affecting one of the above-mentioned members to affect one portion of said pile, means cooperating with the current responsive means affected by manipulation of another portion of said pile, and responsive means affecting the member controlling the last named portion of the pile.

10. The combination with a generator and a regulator therefor comprehending a compressible pile, of independently movable members operating upon each end of said pile, means for dividing said pile, in effect, into independent portions, current responsive means for affecting one of the above-mentioned members to affect one portion of the said pile, means cooperating with the current responsive means affected by manipulation of another portion of said pile, and voltage responsive means affecting the member controlling the last-named portion of the pile.

11. The combination with a variable speed dynamo and a storage battery charged thereby, of means for regulating the dynamo, current responsive means for operating the regulating means to hold the current in a circuit supplied by the generator and supplying current to the battery from exceeding a predetermined limit throughout speed changes of the dynamo, means for affecting the current responsive means and usurping the regulation of the dynamo, means for controlling the operation of the usurping means responsive to voltage fluctuations and adapted to regulate the generator throughout speed changes when the voltage of the same reaches a predetermined value.

JOHN L. CREVELING.